United States Patent [19]
Wold

[11] Patent Number: 5,265,370
[45] Date of Patent: Nov. 30, 1993

[54] COLLAPSIBLE FISHOOK

[76] Inventor: LeRoy Wold, 3017 Lincoln, Franklin Park, Ill. 60131

[21] Appl. No.: 923,071

[22] Filed: Jul. 31, 1992

[51] Int. Cl.$^5$ ............................................. A01K 83/00
[52] U.S. Cl. .................... 43/44.82; 43/43.16
[58] Field of Search ............................ 43/43.16, 44.82

[56] References Cited

U.S. PATENT DOCUMENTS

| | | |
|---|---|---|
| 289,508 | 12/1883 | Dawson. |
| 657,387 | 9/1900 | Bew. |
| 1,875,182 | 8/1932 | Southwell ........................... 43/44.82 |
| 2,782,551 | 2/1957 | Raymond ........................... 43/44.82 |
| 2,783,580 | 3/1957 | Balloni ............................... 43/44.82 |
| 3,027,677 | 4/1962 | Low. |
| 3,092,412 | 6/1963 | Drake ................................. 43/44.82 |
| 3,134,190 | 5/1964 | Triplett et al.. |
| 3,209,483 | 10/1965 | Malik. |
| 4,750,291 | 6/1988 | Chilton ............................... 43/44.82 |

FOREIGN PATENT DOCUMENTS 549166 4/1932 Fed. Rep. of Germany ..... 43/44.82

Primary Examiner—Kurt C. Rowan
Attorney, Agent, or Firm—Wood, Phillips, VanSanten, Hoffman & Ertel

[57] ABSTRACT

A compound fishhook having a first hook having a first shank with spaced ends, a first eye at one of the shank ends, and a first bend at the other shank end; a second hook having a second shank with spaced ends, a second eye at one of the second shank ends, and a second bend at the other second shank end; and structure for maintaining the first and second shanks in adjacent relationship at a location remote from the first and second eyes with one of the first and second eyes directed through the other of the second eyes with the first and second hooks in operative relationship.

23 Claims, 1 Drawing Sheet

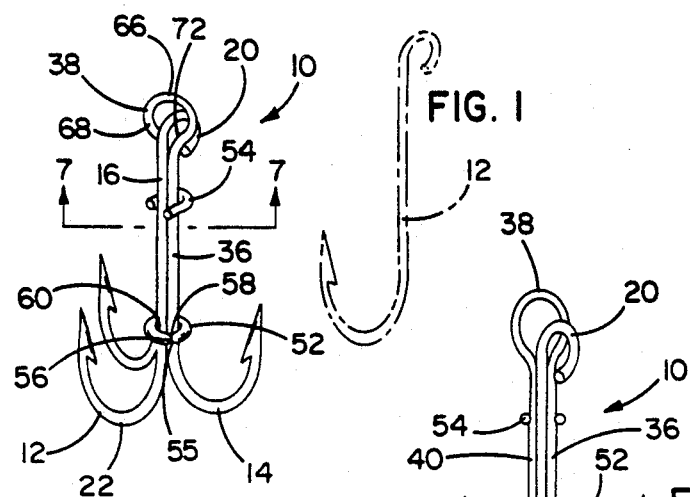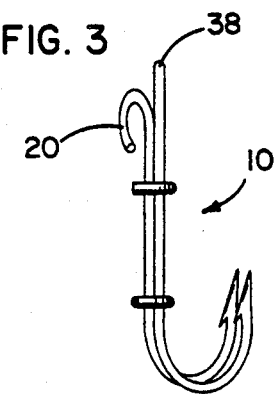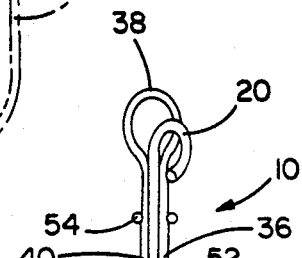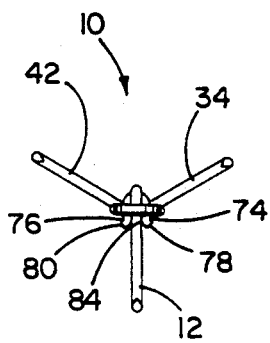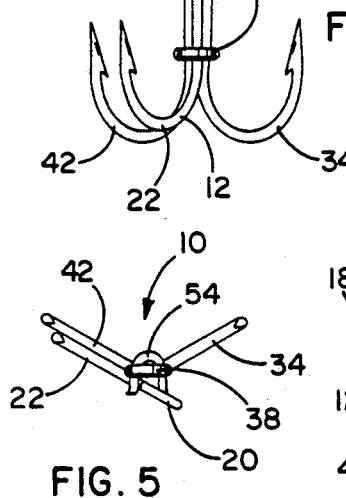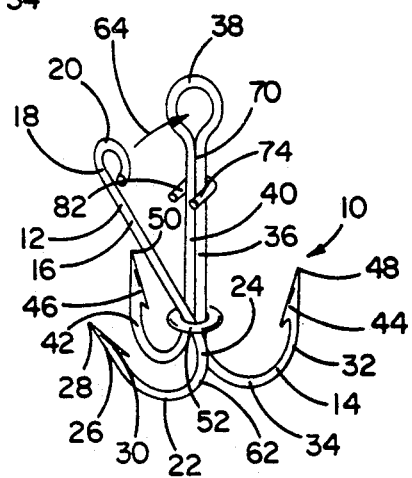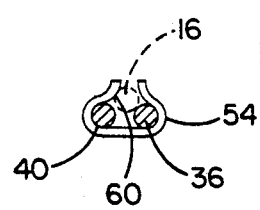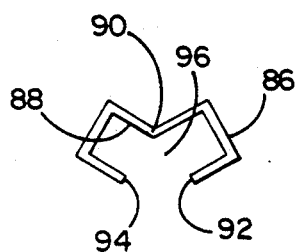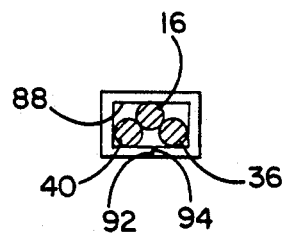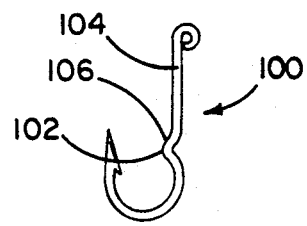

COLLAPSIBLE FISHOOK

BACKGROUND OF THE INVENTION

1. Field of the Invention

This invention relates to fishing tackle and, more particularly, to a fishhook that has first and second hooks that are collapsible and selectively separable to be usable independently of each other.

2. Background Art

Fishhooks conventionally come in three different configurations—single, double and treble.

A single hook commonly has an elongate shank having spaced ends, with their being an eye at one end of the shank and a U-shaped bend at the other end of the shank. The U-shaped bend has a free end which terminates in a point that is sharpened to facilitate its entry into the mouth of a fish. The hooks may be either barbed or unbarbed. The single hook is typically used for trolling with live bait.

A double hook is commonly constructed by forming a single piece of wire so that a second shank is doubled back from the eye to define a second U-shaped bend that is angularly oriented with respect to the first U-shaped bend. The double hook is commonly used by an angler for casting or trolling live bait.

A treble hook is most commonly used on lures and spoons. Each such lure or spoon may have one or more treble hooks. Part of the treble hook is formed in the same fashion as a double hook. In addition, a single hook is welded to the double hook.

Different fishing conditions, terrains, types of fish, types of bait, etc. demand the use of different hook types, i.e. single or compound. Heretofore, anglers have kept a supply of each type of hook, with the hooks being interchanged as conditions dictate.

The conventional fixed configuration hooks have several drawbacks. There is a significant expense involved in keeping a supply of each type of hook on hand. In addition, a fairly large storage container may be required to accommodate the numerous hooks.

In addition to requiring a substantial amount of storage space, the multiple hooks are prone to tangling. This is particularly true of the treble hooks. It is very common for a tackle box, which contains the hooks, to be upset, as in a boat in rough water, during transportation by airplane, during portaging, etc. The user may then be required to spend a substantial amount of time to untangle the various hooks.

The treble hook configuration presents the most significant problems to the angler. First of all, the treble hook does not lend itself to sharpening. The user must attempt to hold the hook in several awkward positions to allow sharpening of the individual hooks.

The treble hook, by reason of its bulky configuration, does not lend itself to compact packaging. Accordingly, lures and plugs normally have a large container to accommodate the one or more treble hooks.

The treble hook is prone to being severely tangled in the webbing of a fishing net. Substantial amounts of time may be spent disengaging the net from the hook. Alternatively, the net may be cut to free the hook. This damages or altogether ruins the net.

The treble hook is also difficult to remove from a fish's mouth. Oft times the fish is injured as the Certain solutions have been offered to overcome some of the above drawbacks associated with conventional hooks. In U.S. Pat. No. 2,783,580, to Balboni, a collapsible hook is disclosed which facilitates compact storage of a treble or double hook. At least one of the hooks has an offset end that is selectively movable into and out of a socket on a sleeve that surrounds a plurality of hook shanks. Collapsing and fanning out of the hooks is accomplished by relative lengthwise shifting and rotating of the individual hooks. Balboni does not disclose any structure whereby the hooks may be separated from each other.

U.S. Pat. No. 3,027,677, to Low, discloses a compound fish hook with a pivotable connection between each hook shank and a bent fish-engaging portion. Repositioning of the bent portion of each hook does not significantly reduce the overall size of the fishhook. Further, each hook is only as strong as the pin which allows the relative pivoting between the hook parts.

U.S. Pat. Nos. 289,508, to Dawson, 657,387, to Bew, and 3,134,190, to Triplett et al, all disclose relatively complicated arrangements to allow selective fanning out and collapsing of individual hooks on a compound fishhook.

For example, Dawson utilizes a threadable cap that selectively blocks the individual hooks in a fanned out position and allows release thereof. The need for multiple parts complicates manufacture, increases attendant costs and makes difficult the conversion between the collapsed and fanned out positions for the fishhook.

U.S. Pat. No. 3,209,483, to Malik, shows two hooks which are relatively movable both rotatively and in translation. There is no structure disclosed to maintain the separate hooks in fixed relationship in either their collapsed or fanned out states. Further, there is no structure disclosed for separating the hooks from each other.

The inventor herein is not aware of any art in which a compound hook is made up of a plurality of hooks that can be selectively joined and fully separated, each from the other, and further whereby one device can be used either as a single hook or a combination of different hooks.

SUMMARY OF THE INVENTION

According to the invention, a compound fishhook is provided having: a first hook having a first shank with spaced ends, a first eye at one of the shank ends, and a first bend at the other shank end; a second hook having a second shank with spaced ends, a second eye at one of the second shank ends, and a second bend at the other second shank end; and structure for maintaining the first and second shanks in adjacent relationship at a location remote from the first and second eyes with one of the first and second eyes directed through the other of the second eyes with the first and second hooks in operative relationship.

The inventive structure allows several combinations of individual hooks to be made. For example, it is possible for a single hook to be combined with either another single hook or a double hook to define a double or treble hook. In one form, each of the first and second hooks is self contained so that the user has the option of using the first hook alone, the second hook alone, or the first and second hooks in combination. The cooperating eyes and the structure maintaining the first and second hooks in adjacent relationship positively maintain the first and second hooks in their operative relationship.

In one form, the structure for maintaining the first and second shanks in adjacent relationship includes a first clip on one of the first and second hooks defining a ring to surround the other of the first and second hooks. The ring may be interrupted, but is preferably continuously formed.

To rigidify the connection between the first and second hooks, a V-shaped bend is optionally provided on the other of the first and second hooks to define a shoulder that abuts the ring to prevent the first and second hooks from being inadvertently moved out of their operative position.

A second clip can be provided and is preferably spaced from the first clip with the first and second hooks in operative relationship. Preferably, the second clip is carried by the first hook to engage and releasably hold the second hook.

At least one of the first and second clips is defined by a formed piece of metal wire.

In one form, the shanks on the first and second hooks are elongate and the ring opens lengthwise of the shank on the one of the first and second hooks. The bend in the other of the first and second hooks is U-shaped and terminates in a point, with their being a gap between the point and the shank on the other of the first and second hooks. The dimension of the ring opening is sufficient to allow the point and at least a part of the U-shaped bend to be directed in a first assembly direction through the ring opening to situate the first and second hooks in operative relationship. By moving the other of the first and second hooks oppositely to the first assembly direction, the first and second hooks can be completely separated, each from the other. Each hook has its own eye to be independently fully functional.

Preferably, the second clip snappingly receives the shank on the other of the first and second hooks with the first and second hooks in their operative relationship. The second clip has a receptacle in communication with a restricted entry opening that is bounded by first and second legs. At least one of the first and second legs is deflectable to allow the shaft on the other of the first and second hooks to move into the receptacle and be held therein by the legs.

The invention also contemplates a compound fishhook having first and second hooks, as previously described, wherein the first and second hooks cooperate to selectively a) maintain the first and second hooks in an operative relationship wherein the first and second hooks cooperatively define at least a double hook and b) allow complete separation of the first and second hooks, each from the other.

In a preferred form, the first and second hooks each comprise a single piece, thereby minimizing parts, simplifying manufacture, and maximizing reliability.

In one form, one of the first and second hooks is a single hook and the other of the first and second hooks is a double hook. The double hook may be defined by a formed piece of wire that is shaped to define the first eye and doubled back upon itself to define adjacent, parallel shanks.

The invention further contemplates a compound fishhook having: a first hook with a first shank with spaced ends, a first eye at one of the shank ends, and a first U-shaped bend at the other shank end and having a free end terminating at a point; a second hook having a second shank with spaced ends, a second eye at one of the second shank ends, and a second U-shaped bend at the other of the second shank ends and having a second free end terminating in a second point; and a clip on the first hook defining an opening which allows the second point and at least a portion of the second U-shaped bend to be directed in an assembly direction through the clip opening whereupon the second hook can be reoriented to be placed in operative relationship in which the first and second hook shanks are in adjacent relationship.

Preferably, the eye on one of the first and second hooks is directed through the eye on the other of the first and second hooks with the first and second hooks in operative relationship.

In one form, there is a second clip o one of the first and second hooks to receive the shank on the other of the first and second clips, with the first and second clips being spaced from each other with the first and second hooks in operative relationship.

BRIEF DESCRIPTION OF THE DRAWINGS

FIG. 1 is a perspective view of a compound fishhook, according to the present invention, made up of a single hook and a double hook, with the single and double hooks shown in operative relationship and the single hook fully separated from the double hook as shown in phantom;

FIG. 2 is a view as in FIG. 1 with the fishhook in a collapsed state;

FIG. 3 is a view as in FIG. 2 rotated through approximately 90° in a counterclockwise direction, when viewed from overhead in FIG. 3;

FIG. 4 is a plan view of the fishhook in FIG. 1 with the hooks in operative relationship;

FIG. 5 is a plan view of the hook in FIG. 2 in its collapsed state;

FIG. 6 is a perspective view of the inventive fishhook with the separate hooks thereon shown in a partially assembled state;

FIG. 7 is a cross-sectional view of the fishhook taken along line 7—7 of FIG. 1;

FIG. 8 is a plan view of a modified form of clip for maintaining the hooks in their operative relationship, with the clip spread to facilitate its assembly;

FIG. 9 is a view as in FIG. 8 showing the clip attached to two hooks, as in FIG. 1, to maintain the hooks in their operative relationship; and FIG. 10 is a side elevation view of a modified form of single hook usable as part of a compound fishhook, according to the present invention.

DETAILED DESCRIPTION OF THE DRAWINGS

Referring initially to FIGS. 1-7, a compound fishhook, according to the present invention, is shown at 10. The fishhook 10 consists of a single hook 12, releasably joined together with a double hook 14 to produce a treble hook, as shown in FIG. 1.

The single hook 12 has an elongate shank 16, with a first end 18 that is doubled back upon itself to define a line receiving eye 20. There is a U-shaped bend 22 at the shank end 24 remote from the eye 20. The U-shaped bend 22 has a free end 26 which terminates in a sharpened point 28. The free end 26 has a barb 30 thereon, which prevents release of the hook 12 once it penetrates the mouth of a fish. The inclusion of the barb 30 is optional.

The double hook 14 is defined by a single piece of steel wire 32. The wire 32 is formed to define a U-shaped bend 34 and a shank 36 and is doubled back on itself to define an eye 38, a second shank 40, parallel and adjacent to the shank 36, and a U-shaped bend 42. The U-shaped bends 34, 42 are configured as the bend 22 on the hook 12. That is, they have barbs 44, 46 terminating in sharpened points 48, 50.

It can be seen that each of the hooks 12, 14 is a self-contained unit. With the hook 12 separated from the hook 14, as shown in phantom in FIG. 1 the line can be tied around the eye 20. Similarly, with the double hook 14 used alone, the line can be tied to the eye 38.

The invention comprehends a structure to allow separable connection of the hooks 12, 14 so that they cooperatively function as a treble hook. There is cooperating structure on the hooks 12, 14 to maintain the hooks 12, 14 in the treble configuration of FIG. 1. More particularly, first and second clips 52, 54 are provided to maintain the hooks 12, 14 in the treble configuration. The clip 52 is defined by a formed wire with its ends welded at a joint 55 so as to define a continuous ring. The ends 56, 58 of the wire defining the first clip 52 may be closely abutted as shown or, alternatively, a slight space, having a width less than the diameter of the shank 16, may be maintained between the ends 56, 58. The clip 52 is welded to the shanks 36, 40 on the hook 14 so that an opening 60 is defined for reception of the hook 12.

To place the hook 12 in its operative position on the hook 14, the hook point 28 is directed downwardly into the clip opening 60. The bend 22 is then directed downwardly until the bight 62 encounters the clip 52. At this point, the hook 12 is repositioned from an inverted orientation to an upright orientation as shown in FIG. 6. The hook 12 is then advanced downwardly through the clip opening 60 until the eye 20 on the hook 12 aligns with the eye 38 on the hook 14. The hook 12 is then tipped in the direction of arrow 64 to advance the eye 20 into and partially through the eye 38 so that the hook 20 is exposed at the side 66 of the eye 38 opposite to the side 68 through which the eye 20 is introduced to the eye 38. The eye 20 projects sufficiently through the eye 38 that a line (not shown) can be tied around the eye 20 projecting out at the side 66 of the eye 38 to secure the fishhook 10. This represents the operative position of the hooks 12, 14.

With the hooks 12, 14 in their operative relationship, the hook shank 16 nests in a valley 70 defined by the adjacent shanks 36, 40. The clip 52 maintains the shank end 24 adjacent to the shanks 36, 40 and in the valley 70 defined therebetween.

The eye 20 nests in a receptacle 72 defined at the juncture between the eye 38 and the shanks 36, 40. The receptacle 72 may be configured so that the eye 20 wedges therein to prevent pivoting of the shank 16 relative to the shanks 36, 40. Pivoting of the hook 12 about the length of the shank 16 is further prevented by the interaction of the eye 20 with the eye 38. More specifically, the eye 20 encounters diametrically opposite portions of the eye 38 to thereby confine the pivoting of the hook 12 to a very limited range about the length of the shank 16.

Further stability for the hook 12 is afforded by the second clip 54. The clip 54 is generally U-shaped and has legs 74, 76 with outturned ends 78, 80. The legs 74, 76, and shanks 36, 40 cooperatively define a receptacle 82 for the hook shank 16. The legs 74, 76 define a restricted entry opening 84 in communication with the receptacle 82. As the hook 12 is tipped from the FIG. 6 position to its operative position of FIG. 1, the shank 16 encounters and slightly spreads at least one, and preferably both, of the legs 74, 76. Once the shank 16 clears the restricted entry opening 84, the legs 74, 76 spring back and positively hold the shank 16 in the receptacle 82.

The inventive fishhook 10 has the advantage that a) it can be either collapsed or b) the hooks 12, 14 can be entirely separated from each other. To effect collapse, the shank end 18 on the hook 12 is tipped oppositely to arrow 64 from the FIG. 1 position so that the eye 20 moves out of the eye 38. At the same time, the shank 16 moves out of the receptacle 82. The hook 12 is then free to be rotated about the length of the shank 16 to either bring the bend 22 to bear on the bend 42 or the bend 34 on the hook 14. In either state, the hook 10 is collapsed to a thickness not significantly greater than the depth of the hook 14 alone, as can be seen clearly in FIGS. 3 and 5. The fishhook can then be stored in a package (not shown) with a thin profile.

Alternatively, the hook 12 can be completely separated from the hook 14 by tipping the hook 12 so that the eye 20 withdraws from the eye 38 whereupon the hook 12 can be advanced upwardly until the clip 52 encounters the hook bight 62, whereupon the hook 12 can be pivoted to an inverted state and withdrawn from the clip 52.

A variation of the clip 52 is shown at 86 in FIG. 8. The clip 86 is configured to define a larger opening 88, to thereby more readily accommodate the barb 30 on the hook 12. The clip 86 has an overall rectangular configuration with a bend 90 at its midportion to thereby create a space between the free ends 92, 94 of the wire defining the clip 86. Once the shanks 36, 40 are directed into the space 96 bounded by the clip 86, the wire ends 92, 94 can be bent towards each other to complete the rectangular shape shown in FIG. 9. The opening 88 can be seen to be significantly wider than the opening 60 defined by the clip 52.

A modified form of single hook is shown in FIG. 10 at 100. The hook 10 is modified from the single hook 12, previously described, by providing a V-shaped bend 102 in the hook shank 104 to thereby define a shoulder 106 to abut the clip 52 and thereby limit upwardly movement of the hook 100 relative to the cooperating double hook 14. At the same time, the application of pressure on the eye 20 causes the clip 52 to bear on the inclined shoulder 106 to thereby cam the hook shank 104 positively into the valley 70 on the hook 14. This rigidifies the connection of the hooks 100, 14 to prevent inadvertent shifting and possible separation thereof.

The foregoing disclosure of specific embodiments is intended to be illustrative of the broad concepts comprehended by the invention.

I claim:
1. A compound fishhook comprising:
a first hook having a first shank with spaced ends, a first eye at one of the shank ends and a first bend at the other shank end;
a second hook having a second shank with spaced ends, a second eye at one of the second shank ends, and a second bend at the other second shank end; and
means for a) maintaining the first and second hooks in operative relationship by maintaining the first and second shanks in adjacent relationship at a location remote from the first and second eyes with one of the first and second eyes directed through the other of the first and second eyes with one of the first and second eyes directed through the other of the first and second eyes and b) allowing the first and second hooks to be completely separated, each from the other out of said operative relationship by relatively moving the first and second hooks without deforming the shanks or eyes on either of the first and second hooks as the hooks are moved between their operative relationship and a fully separated position.

2. The compound fishhook according to claim 1 wherein the maintaining means comprises a first clip on one of the first and second hooks defining a ring to surround the other of the first and second hooks, said first clip defining an opening large enough to allow the other shank end on the other of the first and second hooks to be passed into and out of the ring to allow the first and second hooks to be selectively placed in operative relationship and separated from each other.

3. The compound fishhook according to claim 2 wherein the ring is continuous.

4. The compound fishhook according to claim 2 wherein the maintaining means includes a second clip spaced from the first clip with the first and second hooks in operative relationship, there being means for fixedly connecting the second clip to the first hook to engage and releasably hold the second hook.

5. The compound fishhook according to claim 1 wherein the first and second shanks are elongate and the maintaining means comprises first and second clips spaced lengthwise of the first and second shanks with the first and second hooks in operative relationship.

6. The compound fishhook according to claim 5 wherein at least one of the clips comprises a formed piece of wire.

7. The compound fishhook according to claim 2 wherein the shank on the one of the first and second hooks is elongate, and the ring opens lengthwise of the shank on the one of the first and second hooks.

8. The compound fishhook according to claim 7 wherein the one of the first and second hooks is a double hook with a hook pair with each hook in the hook pair having a shank and the other of the first and second hooks is a single hook and the single hook does not have any part that extends fully through between the shanks on the hooks in the hook pair on the double hook with the first and second hooks in operative relationship.

9. The compound fishhook according to claim 1 wherein the bend on the other of the first and second hooks is U-shaped and terminates in a point with there being a gap between the point and the shank on the other of the first and second hooks, a ring is provided on one of the first and second hooks and the ring bounds an opening having a fixed dimension sufficient to allow the point and at least a part of the U-shaped bend to be directed in a first assembly direction through the ring opening to situate the first and second hooks in operative relationship, whereupon by moving the other of the first and second hooks oppositely to the first assembly direction, the first and second hooks can be completely separated, each from the other.

10. The compound fishhook according to claim 9 wherein there is a second clip spaced from the first clip to snappingly receive the shank on the other of the first and second hooks with the first and second hooks in their operative relationship.

11. The compound fishhook according to claim 10 wherein the second clip has a receptacle in communication with an entry opening that is bounded by first and second legs, at least one of the first and second legs being deflectable to allow the shank on the other of the first and second hooks to move into the receptacle.

12. The compound fishhook according to claim 2 wherein the maintaining means includes a shoulder on the other of the first and second hooks to abut the first clip and thereby prevent the first and second hooks from inadvertently being moved out of their operative relationship.

13. The compound fishhook according to claim 12 wherein the other of the first and second hooks has a V-shaped bend in its shank to define the shoulder.

14. The compound fishhook comprising:
a first hook having a first shank with spaced ends, a first eye at one of the shank ends and a first bend at the other shank end;
a second hook having a second shank with spaced ends, a second eye at one of the second shank ends, and a second bend at the other second shank end; and
cooperating means on the first and second hooks for selectively a) maintaining the first and second hooks in an operative relationship wherein the first and second hooks cooperatively define a compound hook and b) allowing complete separation of the first and second hooks, each from the other without deforming the shanks or eyes on either of the first and second hooks as the hooks are moved between a fully separated position and their operative relationship.

15. The compound fishhook according to claim 14 wherein the first and second hooks each comprise a single piece.

16. The compound fishhook according to claim 15 wherein one of the first and second hooks ha a clip to maintain the first and second hooks in operative relationship and allow the first and second hooks to be completely separated, each from the other.

17. The compound fishhook according to claim 15 wherein there are spaced first and second clips on the first and second hooks to maintain the first and second hooks in operative relationship.

18. The compound fishhook according to claim 14 wherein the first hook is a double hook with two shanks formed by a single piece of wire that is shaped to define the first eye and the second eye is directed through the first eye with the first and second hooks in operative relationship.

19. The compound fishhook according to claim 18 wherein the second eye resides in the first eye between a portion of the first and second shanks with the first and second hooks in operative relationship.

20. A compound fishhook comprising:
a first hook having a first shank with spaced ends, a first eye at one of the shank ends, a first U-shaped bend at the other shank end having a free end terminating in a point;
a second hook having a second shank with spaced ends, a second eye at one of the second shank ends and a second U-shaped bend at the other of the second shank ends and having a second free end terminating in a second point; and
a first clip on the first hook defining an opening which allows the second point and at least a portion of the second U-shaped bend to be directed selectively a) in an assembly direction through the clip opening whereupon the second hook can be reoriented to be placed in operative relationship in which the first and second hook shanks are in adjacent relationship and b) oppositely to the assembly direction with the hooks in operative relationship to allow the hooks to be completely separated, each from the other.

21. The compound fishhook according to claim 20 wherein the eye on one of the first and second hooks is directed through the eye on the other of the first and second hooks with the first and second hooks in operative relationship.

22. The compound fishhook according to claim 20 wherein there is a second clip on one of the first and second hooks to receive the shank on the other of the first and second clips, said first and second clips being spaced from each other with the first and second hooks in operative relationship.

23. The compound fishhook according to claim 22 wherein the second clip has means for releasably snappingly receiving the shank on the other of the first and second clips.

* * * * *